F. O. JAQUES, Sr.
AMPLIFYING MEASURING INSTRUMENT.
APPLICATION FILED MAY 3, 1915.

1,167,644.

Patented Jan. 11, 1916.

INVENTOR:
Fernando Oscar Jaques, Sr.,
by Chas. H. Luther
ATTORNEY.

UNITED STATES PATENT OFFICE.

FERNANDO OSCAR JAQUES, SR., OF CRANSTON, RHODE ISLAND.

AMPLIFYING MEASURING INSTRUMENT.

1,167,644.  Specification of Letters Patent.  Patented Jan. 11, 1916.

Application filed May 3, 1915. Serial No. 25,485.

*To all whom it may concern:*

Be it known that I, FERNANDO OSCAR JAQUES, Sr., a citizen of the United States, residing at Cranston, in the county of Providence and State of Rhode Island, have invented a new and useful Improvement in Amplifying Measuring Instruments, of which the following is a specification.

My invention has reference to an improvement in measuring instruments and more particularly to an improvement in a form of measuring instrument adapted to measure and indicate to one one-thousandths of an inch or less. Such a measuring instrument reading to one one-thousandth of an inch, as heretofore constructed, usually has a scale with lines indicating units of measurement. As these scales are small with the lines close together it is impossible to indicate each line with a numeral, consequently it is necessary to count the lines in a given reading, which requires careful work and attention and loss of time, to avoid mistakes.

The object of my invention is to improve the construction of a measuring instrument adapted to measure to one one-thousandths of an inch, whereby each one one-thousandths of an inch is indicated by a numeral or numerals and the numerals are sufficiently large so as to be easily and quickly seen, thereby eliminating mistakes in the reading.

A further object of my invention is to provide such a measuring instrument with an enlarged scale in proportion such as 5 to 1, whereby the scale may be finely divided so as to give readings to one tenthousandths of an inch or less and the same easily seen.

Final objects of my invention are to improve and simplify the construction and reduce the cost of manufacturing an amplifying measuring instrument.

My invention consists in the peculiar and novel construction of an amplifying measuring instrument, said instrument having details of construction, as will be more fully set forth hereinafter and claimed.

Figure 1:
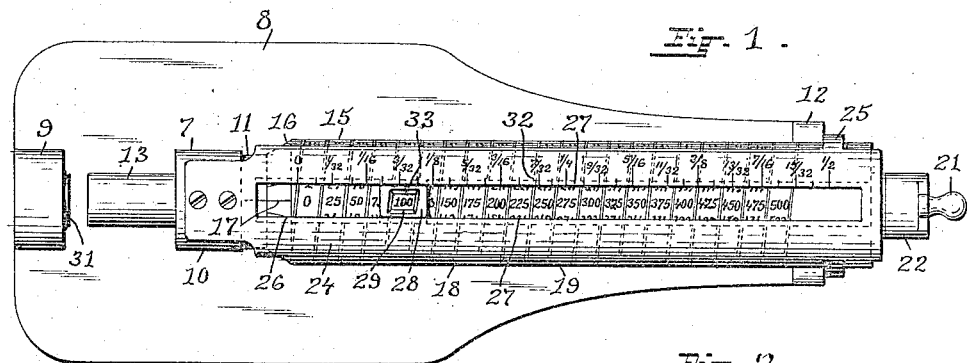
Figure 2:
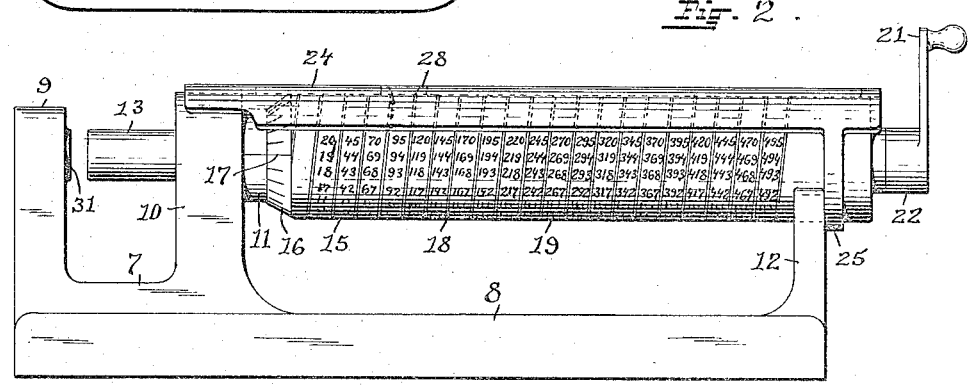
Figure 3:
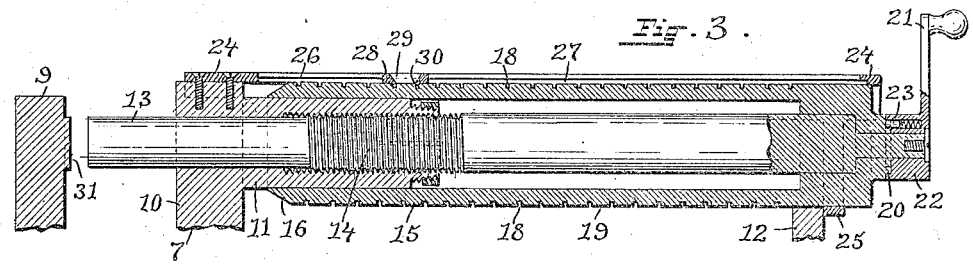
Figure 4:
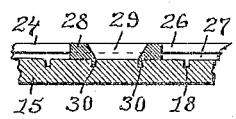
Figure 5:
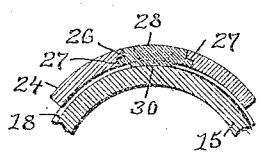
Figure 6:
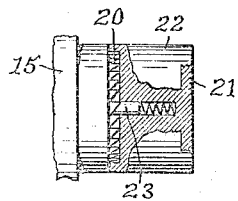

Figure 1, is an enlarged top plan view of my improved amplifying measuring instrument, adapted to measure up to one-half of an inch by thousandths of an inch. Fig. 2, is an enlarged side view of the instrument. Fig. 3, is an enlarged vertical longitudinal sectional view through the instrument with the base portion broken away. Fig. 4 is a still further enlarged detail sectional view taken lengthwise through the slide and a portion of the cylinder. Fig. 5, is an enlarged detail sectional view taken transversely through the slide, the slide arm and a portion of the cylinder and showing the fin on the slide operatively connecting the slide with the spiral groove on the cylinder, and Fig. 6, is an enlarged detail view partly in section and showing the ratchet connection between the crank and the cylinder.

In the drawings 7 indicates a frame having a base 8, a vertical measuring arm 9 at one end, an intermediate vertical sleeve arm 10 supporting a horizontal internally screw-threaded sleeve 11 and a vertical cylinder supporting arm 12 at the opposite end, all of said arms being located on a line extending centrally lengthwise of the base. A spindle 13 screw-threaded at 14 for a predetermined portion of its length, is in screw-threaded engagement with the sleeve 11 and extends through the sleeve 11 and arm 10, said screw-threads being right hand and 40 pitch. A cylinder 15 is secured to or forms a part of the spindle 13. This cylinder 15 has a beveled forward end 16 on which is a scale 17 formed by lines, an external left hand spiral groove 18 extending around the cylinder and forming an intermediate left hand spiral face 19 on which is a continuous series of numerals from 0 to 500 indicating measurements by one one-thousandths of an inch, and a circular series of ratchet teeth 20 on the end of the cylinder. A crank 21 having a hub 22 is rotatably secured to the outer end of the spindle 13 and has a spring pressed pawl 23 engaging with the ratchet teeth 20. A slide arm 24 is secured at its forward end to the sleeve arm 10 and is shaped to conform to the cylinder 15. This slide arm 24 extends centrally over the cylinder 15 and has a ring 25 at its outer end embracing the cylinder 15, and a central longitudinal slot 26 the edges of which are undercut and form longitudinal guideways 27. 27. A slide 28 is shaped to have a sliding fit in the slot 26 and guide-ways 27. 27, a sight opening 29, and fins 30. 30 on its underside which enter the spiral groove 18 on the cylinder 15. The arm 9 has a raised face 31 in alinement with the end of the spindle 13, arm 12 supports the outer end of the cylinder 15, and a large scale 32 may be formed on the arm 24. As shown this scale represents one-half of an inch divided into sixty-fourths of an inch and is indicated by a line 33 on the side 28. This large scale may be divided by lines indicating one-thousandths of an inch or less.

In the operation of my improved amplifying measuring instrument the spindle 13 is moved outward by turning the crank 21 to the left and inwardly by turning the crank to the right. On turning the crank to the left the flat side of the pawl 23 engages with the flat side of the ratchet teeth 20, forming a positive connection and revolving the spindle 13 and cylinder 15 to the left and through the spiral groove 18, on the cylinder 15 and fins 30. 30 on the slide 28 moves the slide 28 outward on the arm 24, and showing in succession the numerals on the spiral face 19, through the sight opening 29 in the slide. The article to be measured is now placed between the face 31 and the end of the spindle 13, and the crank 21 turned to the right until the end of the spindle 13 touches the article, when the pawl 23 will automatically disengage from the ratchet teeth 20. The slide 28 has now moved inward and the measurement of the article indicated by numerals seen through the sight opening 29, in the slide 28.

As shown in Fig. 1 a reading of one hundred one-thousandths of an inch is seen through the sight opening in the slide. With 40 pitch screw-threads on the spindle 13 there are twenty-five readings by numerals on each complete turn of the spiral face 19, on the cylinder 15, and with 20 pitch screw-threads on the spindle there would be fifty readings by numerals to each complete turn of the spiral face on the cylinder. The pitch of the spiral groove 18 is approximately five to one of the screw-threads on the spindle, thereby giving sufficient width to the spiral face 19, for numerals of a size that can be readily and easily seen through the sight opening in the slide.

I do not wish to confine myself to the construction shown, as it is evident that the same may be widely varied within the scope of the appended claims.

Having thus described my invention I claim as new:

1. A measuring instrument having a frame, a screw-threaded spindle in screw-thread engagement with the frame, a cylinder on the spindle and having an external spiral groove the pitch of which is in a reverse direction to the screw-threads on the spindle, said spiral groove forming a spiral face on the cylinder on which is indicated units of measurement.

2. A measuring instrument having a frame, a screw-threaded spindle in screw-thread engagement with the frame, a cylinder on the spindle and having an external spiral groove the pitch of which is greater and in a reverse direction to the screw-threads on the spindle, said spiral groove forming a spiral face on the cylinder on which is indicated units of measurement.

3. A measuring instrument having a frame, a sleeve on the frame, a screw-threaded spindle in screw-thread engagement with the sleeve, a cylinder on the spindle and having a spiral groove forming a spiral face on the cylinder on which are units of measurements, an arm over the cylinder and having a slot, a slide reciprocally supported on the arm in the slot and having a sight opening, and means for operatively connecting the slide with the spiral groove on the cylinder.

4. A measuring instrument having a frame, a screw-threaded spindle in screw-thread engagement with the frame, a cylinder on the spindle and having a spiral face on which is indicated units of measurements, an arm over the cylinder, a slide having a sight opening, means for reciprocally supporting the slide on the arm, and means for giving a greater longitudinal movement to the slide than the longitudinal movement given to the cylinder, by the spindle.

5. A measuring instrument having a frame, a sleeve on the frame, a screw-threaded spindle screw-threaded through the sleeve, a cylinder on the spindle and having a spiral groove forming a spiral face on the cylinder on which is indicated units of measurement, an arm over the cylinder, a slide on the arm and having a sight opening, means for reciprocally supporting the slide on the arm, means for operatively connecting the slide with the spiral groove on the cylinder, and means for rotating the spindle and cylinder.

6. A measuring instrument having a frame comprising a base, a measuring arm, a sleeve arm and a cylinder supporting arm on the base, an internally screw-threaded sleeve on the sleeve arm, a spindle having right hand screw-threads in screw-thread engagement with the sleeve, a cylinder on the spindle and having an external left hand spiral groove, an intermediate spiral face on the cylinder on which are numerals indicating units of measurement, an arm over the cylinder, a scale on the arm, a slide on the arm and having a sight opening and a fin engaging with the spiral groove on the cylinder, means for reciprocally supporting the slide on the arm and means for positively rotating the spindle in one direction and frictionally rotating the spindle in the opposite direction.

7. A measuring instrument for measuring or calipering solid substances such as metal, wood or the like, said measuring instrument having a frame, a screw-threaded spindle in screw-threaded engagement with the frame, a cylinder on the screw-threaded spindle and having an external spiral guide-way forming an intermediate spiral face on the cylinder on which is a plurality of numerals forming units of measurement, a slide having a sight opening to coöperate with said spiral face and numerals, means for reciprocally supporting the slide and means for operatively connecting the slide to the spiral guide-way.

8. A measuring instrument for the purpose described and having a frame, a screw-threaded spindle in screw-threaded engagement with the frame, a cylinder on the screw-threaded spindle and having a uniform spiral face the pitch of which is in excess of the pitch of the screw-threads on the spindle, said spiral face having units of measurement, a slide having a sight opening which coöperates with said spiral face and units of measurement, means for reciprocally supporting the slide and means for giving a longitudinal movement to the slide, whereby, on revolving the screw-threaded spindle, the spiral face is revolved and moves longitudinally relatively to the frame, and a longitudinal movement is given to the sight opening in the slide synchronously with the longitudinal movement of the spiral face, and the units of measurement on the spiral face are readily seen in succession through the sight opening in the slide.

In testimony whereof, I have signed my name to this specification.

FERNANDO OSCAR JAQUES, Sr.

Copies of this patent may be obtained for five cents each, by addressing the "Commissioner of Patents, Washington, D. C."